(12) United States Patent
Metelski

(10) Patent No.: US 7,595,941 B2
(45) Date of Patent: Sep. 29, 2009

(54) DEVICE FOR VIBRATION-FREE MOUNTING OF A DRIVE MOTOR IN A STAND OF A SURGICAL MICROSCOPE

(75) Inventor: Andrzej Metelski, Romanshorn (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 0 days.

(21) Appl. No.: 11/847,581

(22) Filed: Aug. 30, 2007

(65) Prior Publication Data

US 2008/0055739 A1 Mar. 6, 2008

(30) Foreign Application Priority Data

Aug. 31, 2006 (DE) ...................... 10 2006 040 867
Sep. 21, 2006 (DE) ...................... 10 2006 044 688

(51) Int. Cl.
G02B 7/02 (2006.01)
(52) U.S. Cl. ...................................... 359/819; 359/811
(58) Field of Classification Search .................. 359/819
See application file for complete search history.

(56) References Cited

U.S. PATENT DOCUMENTS 4,466,034 A * 8/1984 Newberry ................... 360/267
5,667,186 A 9/1997 Luber et al.
2006/0250685 A1 11/2006 Metelski

OTHER PUBLICATIONS

Getzner Werkstoffe, "Effective insulation of machine-generated vibrations-SYLOMER", Austria, Apr. 2002.
Getzner Werkstoffe, "Overview of materials", Austria, Aug. 2004.

* cited by examiner

Primary Examiner—Jordan M. Schwartz
Assistant Examiner—James C Jones
(74) Attorney, Agent, or Firm—Hodgson Russ LLP

(57) ABSTRACT

A device for vibration-free mounting of a drive motor on or in a stand of a surgical microscope is described. The drive motor is embodied as a stepper motor (1) and is joined to the stand via a receiving flange (2). An elastomeric mount (3) is arranged between the stepper motor (1) and the receiving flange (2) in order to damp pulses and/or vibrations that occur.

4 Claims, 3 Drawing Sheets

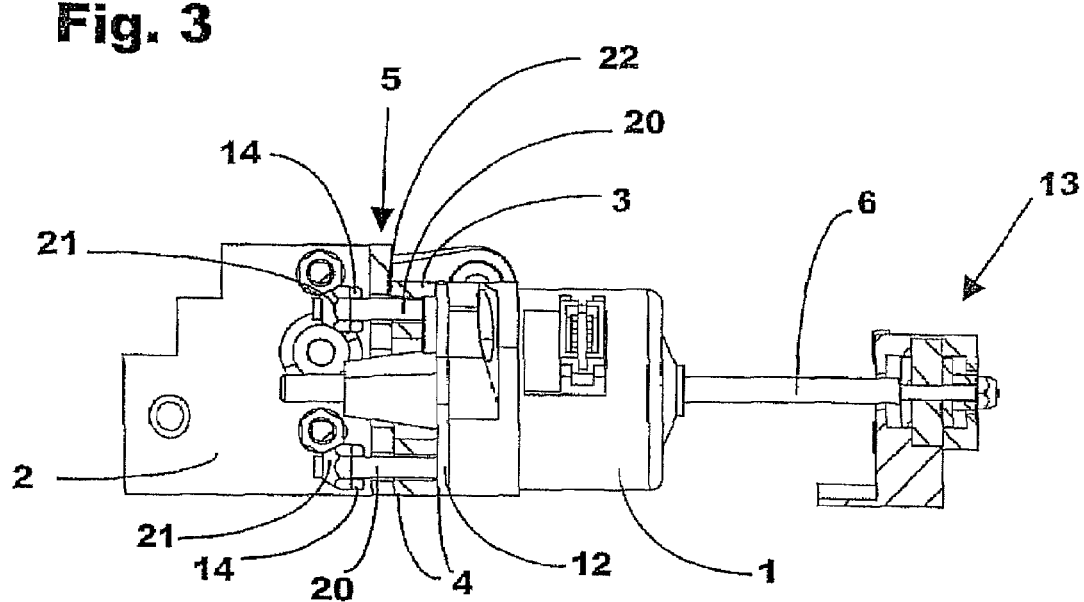
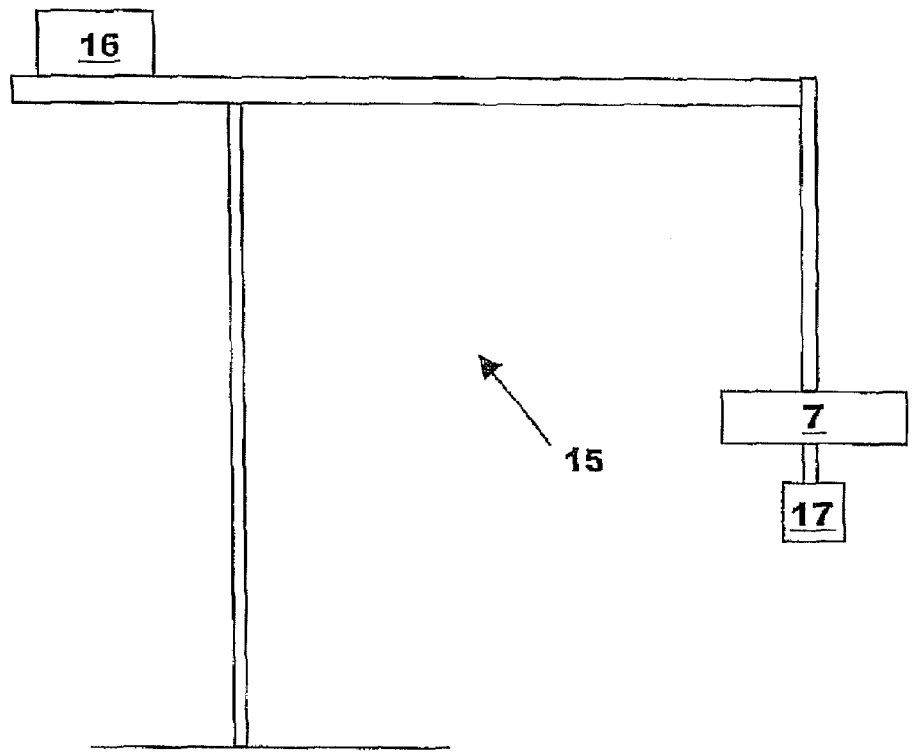

DEVICE FOR VIBRATION-FREE MOUNTING OF A DRIVE MOTOR IN A STAND OF A SURGICAL MICROSCOPE

CROSS REFERENCE TO RELATED APPLICATIONS

This application claims priority of German patent application 10 2006 040 867.5 filed Aug. 31, 2006 and German patent application 10 2006 044 688.7 filed Sep. 21, 2006, both of which are incorporated by reference herein.

FIELD OF THE INVENTION

The invention relates to a device for vibration-free mounting of a drive motor in a stand of a surgical microscope.

BACKGROUND OF THE INVENTION

The purpose of the stands of a surgical microscope is on the one hand to hold the microscopes securely, and on the other hand to ensure counterbalanced positioning of the surgical microscope. This counterbalancing is usually achieved by way of displaceable counterweights so that, despite changeable loads, the microscope is easily positionable in three dimensions.

DE 43 20 443 A1 discloses a stand for a surgical microscope that uses displaceable weights for weight compensation. Also presented in this document is a motorized X-Y positioning unit that is arranged on the stand and carries the surgical microscope. The motorized X-Y positioning unit comprises two carriages that are embodied movably via a DC motor and a linkage. This X-Y positioning unit is evidently used in this document to carry out an automatic fine balancing of the surgical microscope.

An X-Y positioning unit of this kind can also be used in a counterbalanced microscope or stand to move the surgical microscope over the surgical site in the X and Y directions so as thereby to establish a different image area during the operation.

The existing solution provides, for such displacement by an X-Y positioning unit, DC motors having an encoder and linkage. These solutions have proven to function well, but because of the many components are very complex and of correspondingly large dimensions. The linkages furthermore cause noise, which has been reduced by way of so-called solid-borne sound dampers. An apparatus for securing a solid-borne sound-transferring component is depicted and described in DE 10 2005 014 376 (not previously published).

Previous attempts to replace the DC motors having a separate linkage and encoder with stepper motors of simple construction having an integrated spindle failed because the individual steps of the motors resulted in a jerky motion in the image. Jerky motions in the image are, however, unacceptable to a surgeon. A further disadvantage of the jerky motion arose from oscillations of the moving mass, in particular of the microscope. The microscope, weighing approximately 15 kg, begins to oscillate slowly, and the result is an unstable image for the surgeon. The microscope continues to oscillate even after the individual steps of the stepper motor have ended. This has proven to be unusable in practice.

SUMMARY OF THE INVENTION

It is an object of the present invention to enable the use of stepper motors and to eliminate the disadvantages referred to above.

This object is achieved by the invention described herein.

The invention is notable for the fact that the stepper motor is arranged on a flange and a technical spring is provided between the flange and the stepper motor, so that no direct connection exists between the motor and the flange.

The motion of the motor, i.e. at each individual step, causes torrosion [?torsion] between the motor and the housing. Without vibration-free mounting of the motor, this torrosion would be transferred as a pulse to the housing and the stand. The embodiment of the spring as an elastomeric mount causes this motion or torsion to be received by the mount and returned to the motor. No pulse transfer to the housing therefore takes place, and oscillation of the microscope is prevented.

An elastomeric damper having the aforementioned properties is marketed, for example, by the company styled Getzner Werkstoffe, Bürs/Bludenz, Austria.

In a further embodiment of the invention, the elastomeric mount is adhesively bonded between the motor and the stand or receiving flange. The result of this is that the motion of the motor is transferred directly to the mount, and lateral shear forces are also absorbed by the elastomeric mount. With a mount clamped between two plates, the risk exists that the adhesive friction between the plates and the mount is less than the shear forces that occur, thus resulting in an undesired displacement of the mount.

In a refinement of the invention, a resiliently mounted screw connection is arranged in order to prevent shear detachment, which connection functions solely as a motion stop and, in the context of pulse-like motions of the motor, prevents the elastomeric mount from tearing away from the motor and/or from the flange.

In a refinement of the invention, the stepper motor is directly equipped with a spindle so that an additional linkage is superfluous.

In a preferred embodiment of the invention, the stepper motor having the elastomeric mount is arranged as a drive in an X-Y displacement unit for the surgical microscope so as thereby to ensure vibration-free movement of the microscope over the surgical site even during the operation.

In a further embodiment of the invention, the stepper motor having the elastomeric mount is provided as a drive for a zoom system in the surgical microscope, so that no vibrations are transferred to the stand or to the surgical microscope upon a change in magnification by adjustment of the zoom.

BRIEF DESCRIPTION OF THE DRAWINGS

The invention is schematically depicted in the drawings and will be described below in an exemplifying embodiment with reference to the Figures, in which:

FIG. 3 is a sectioned depiction of the stepper motor with flange; and

FIG. 4 shows a stand having a surgical microscope and X-Y displacement device.

DETAILED DESCRIPTION OF THE INVENTION

Figure 1:
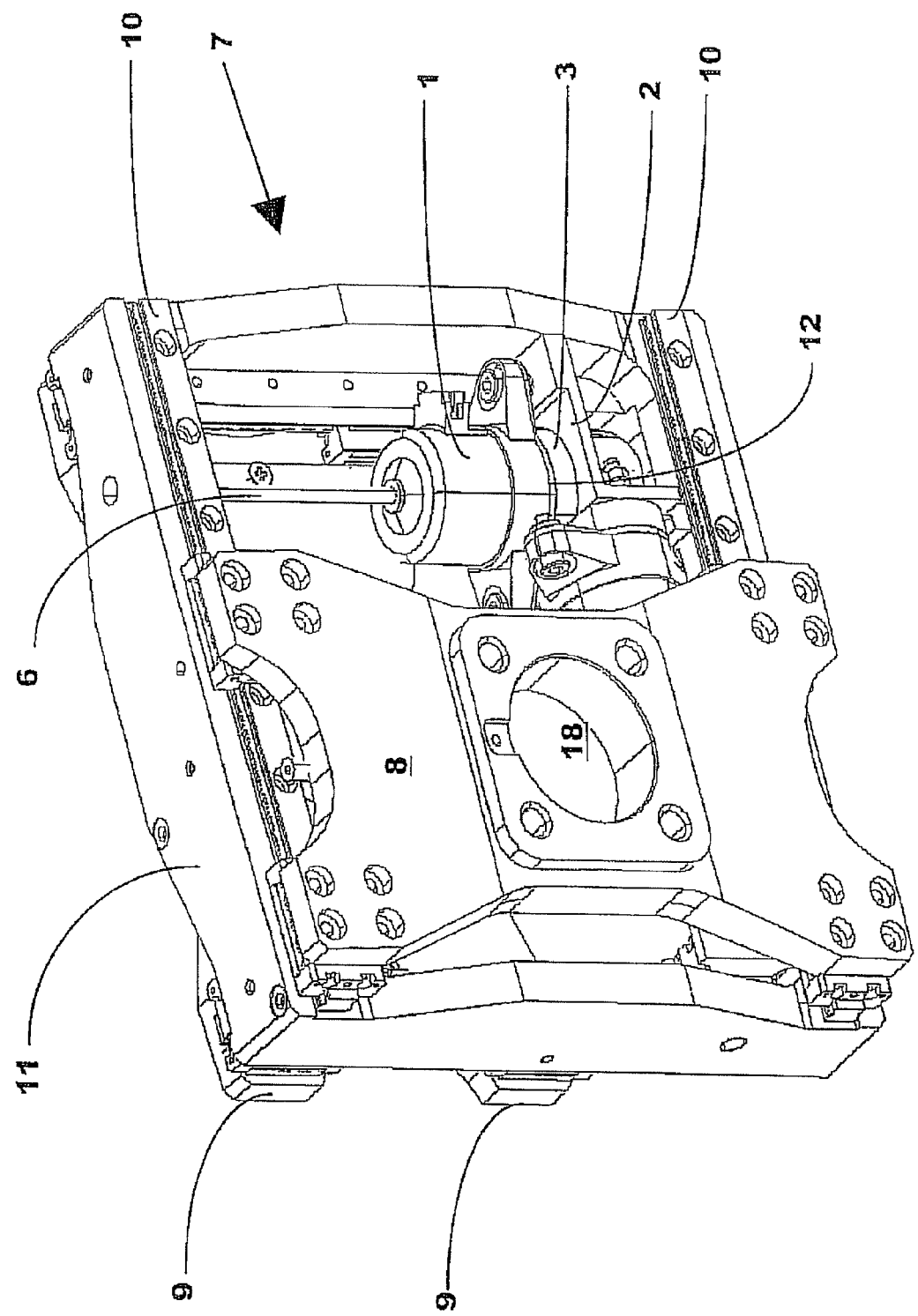
FIG. 1 is a view of an X-Y carriage having stepper motors.

FIG. 1 is a view of X-Y displacement unit 7 having a frame 11. Arranged on frame 11 is a linear guidance system 10 on which an X-carriage 8 is movably secured. A Y-carriage 9 is arranged in equivalent fashion on the other side of frame 11. Associated with each of carriages 8, 9 is a receptacle 18 for a stand arm (not depicted) of a surgical microscope.

A stepper motor 1 having a threaded spindle 6 is provided to drive Y-carriage 9. Stepper motor 1 comprises a securing plate 12 and is joined via an elastomeric mount 3 to a receiving flange 2. Receiving flange 2 is mounted on frame 11. Elastomeric mount 3 is mounted both on stepper motor 1 and on receiving flange 2 via a respective adhesive join.

Motions or vibrations occurring at stepper motor 1 are thus received and absorbed by elastomeric mount 3. Elastomeric mount 3 is embodied for this purpose as a technical spring that has a distinctly dynamic and highly elastic behavior. Elastomeric mount 3 has a minimum thickness of 4 mm. Elastomeric mount 3 may be made of a closed cell polyether urethane (PUT) sold by Getzner Werkstoffe under the trademark SYLODYN NC.

Figure 2:
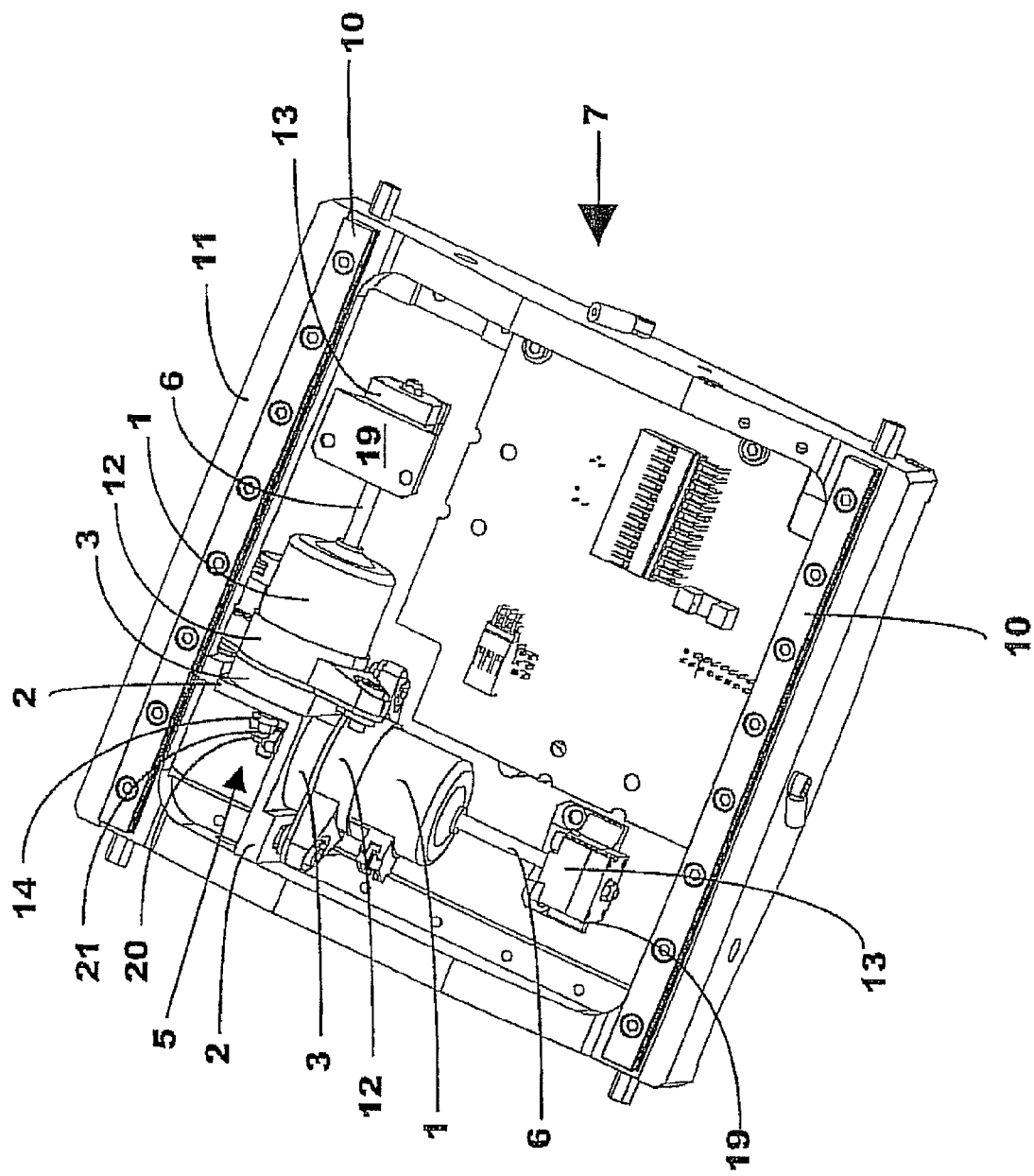
FIG. 2 shows the arrangement of the stepper motors in the carriage.

FIG. 2 is a view of X-Y displacement unit 7 with the stationary frame 11 and with a pair of stepper motors 1 for X-carriage 8 and Y-carriage 9 (not depicted here), respectively. Each stepper motor 1 is joined via an associated elastomeric mount 3 to attachment flange 2, which is formed as a right angle member including two orthogonal mounting surfaces. A screw connection 5 is secured on securing plate 12 as a shear prevention system, to prevent shear detachment of stepper motor 1 from elastomeric mount 3 or of elastomeric mount 3 from attachment flange 2. Screw connection 5 comprises a screw 20 having a nut 21 and an O-ring 14, and is guided through an orifice (not depicted) in both elastomeric mount 3 and receiving flange 2.

Spindle 6 of stepper motor 1 is retained in a spindle guide 13 and rotates when motor 1 is energized. An attachment plate 19 runs on spindle 6 as a drive system for the Y-carriage. A similar system is provided for driving the X-carriage.

FIG. 3 is a section through receiving flange 2, with adhesive join 4 between elastomeric mount 3 and securing plate 12 of stepper motor 1 and between elastomeric mount 3 and receiving flange 2.

Screw connection 5, made up of screw 20, O-ring 14 constituting a rubber buffer, and a nut 21, prevents elastomeric mount 3 from tearing away from stepper motor 1 or from receiving flange 2 in a context of large motions of stepper motor 1 in an axial direction. A nonpositive connection occurs in such cases between O-ring 14 and attachment flange 2, so that the motion of stepper motor 1 in an axial direction is limited.

It is also clear from this drawing that in the initial position, screw 20 is joined on one side to securing plate 12 and projects via an orifice 22 through receiving flange 2, there being no operative connection between screw 20 and receiving flange 2.

FIG. 4 schematically shows a stand 15 with a counterweight 16 and a surgical microscope 17 that is secured via X-Y displacement unit 7 on the stand. The image area of surgical microscope 17 can be modified by way of X-Y displacement unit 7.

PARTS LIST

1 Stepper motor
2 Receiving flange
3 Elastomeric mount
4 Adhesive join
5 Screw connection
6 Spindle
7 X-Y displacement unit
8 X-carriage
9 Y-carriage
10 Linear guidance system
11 Frame
12 Securing plate
13 Spindle guide
14 O-ring
15 Stand
16 Counterweight
17 Surgical microscope
18 Receptacle
19 Attachment plate
20 Screw
21 Nut
22 Orifice

What is claimed is:

1. A device comprising:
a receiving flange;
a stepper motor secured on the receiving flange, wherein the stepper motor includes a securing plate facing the receiving flange;
at least one elastomeric mount arranged between the securing plate of the stepper motor and the receiving flange to damp vibrations and pulses resulting from operation of the stepper motor, and
a screw connection between the stepper motor and the receiving flange to prevent shear detachment of the stepper motor from the receiving flange, wherein the screw connection includes a screw fixed at one end to the securing plate and arranged to extend through an orifice in the elastomeric mount and through an orifice in the receiving flange, a nut mounted on an opposite end of the screw, and an O-ring mounted on the screw between the nut and the receiving flange.

2. The device according to claim 1, wherein the at least one elastomeric mount is joined to the stepper motor by a first layer of adhesive and is joined to the receiving flange by a second layer of adhesive.

3. The device according to claim 1, wherein the stepper motor includes a rotating spindle.

4. The device according to claim 1, wherein the elastomeric mount has a minimum thickness of 4 mm.

* * * * *